US008898450B2

(12) United States Patent
Harjanto et al.

(10) Patent No.: US 8,898,450 B2
(45) Date of Patent: Nov. 25, 2014

(54) HARDWARE IDENTITY IN MULTI-FACTOR AUTHENTICATION AT THE APPLICATION LAYER

(75) Inventors: Dono Harjanto, Irvine, CA (US); Bradley Craig Davis, Irvine, CA (US)

(73) Assignee: DeviceAuthority, Inc., Fremont, CA (US)

( * ) Notice: Subject to any disclaimer, the term of this patent is extended or adjusted under 35 U.S.C. 154(b) by 0 days.

(21) Appl. No.: 13/517,584

(22) Filed: Jun. 13, 2012

(65) Prior Publication Data

US 2012/0317622 A1    Dec. 13, 2012

Related U.S. Application Data

(60) Provisional application No. 61/496,508, filed on Jun. 13, 2011.

(30) Foreign Application Priority Data

Oct. 7, 2011  (AU) ................................ 2011101295

(51) Int. Cl.
*H04L 29/06*  (2006.01)
*G06F 21/44*  (2013.01)

(52) U.S. Cl.
CPC ........... *G06F 21/44* (2013.01); *H04L 2463/082* (2013.01); *H04L 63/08* (2013.01)
USPC ................................ 713/152; 726/4; 713/186

(58) Field of Classification Search
None
See application file for complete search history.

(56) References Cited

U.S. PATENT DOCUMENTS

| 4,246,638 | A | | 1/1981 | Thomas |
| 4,779,224 | A | | 10/1988 | Moseley et al. |
| 4,891,503 | A | | 1/1990 | Jewell |
| 5,210,795 | A | | 5/1993 | Lipner et al. |
| 5,235,642 | A | | 8/1993 | Wobber et al. |
| 5,239,166 | A | | 8/1993 | Graves |
| 5,241,594 | A | | 8/1993 | Kung |
| 5,666,415 | A | | 9/1997 | Kaufman |
| 6,041,411 | A | * | 3/2000 | Wyatt .............................. 726/29 |

(Continued)

FOREIGN PATENT DOCUMENTS

| EP | 1 637 958 | 3/2006 |
| EP | 2312483 | 4/2011 |

(Continued)

OTHER PUBLICATIONS

Zhu, Yunpu, "A New Architecture for Secure Two-Party Mobile Payment Transactions," Submitted to the School of Graduate Studies of the University of Lethbridge, Master of Science, 2010, 240 pages.

(Continued)

*Primary Examiner* — David Le
(74) *Attorney, Agent, or Firm* — Sean D. Burdick

(57) ABSTRACT

Device authentication is implemented at the application layer of a computer communication model to add a factor to user authentication without requiring any action by the user. User space applications, such as web browsers, e-mail readers, and such, can remain completely unaffected. Instead, the additional authentication factor is provided at the application layer, typically in an operating system, where protocols such as HTTP(s), FTP(s), POP, SMTP, SNMP and DNS are implemented. Authentication is performed by a challenge/response transaction and the client device's digital fingerprint is compared to a whitelist of digital fingerprints of authorized client devices.

5 Claims, 5 Drawing Sheets

(56) References Cited

U.S. PATENT DOCUMENTS

| | | | |
|---|---|---|---|
| 6,161,185 A | 12/2000 | Guthrie et al. | |
| 6,167,517 A | 12/2000 | Gilchrist et al. | |
| 6,243,468 B1 | 6/2001 | Pearce et al. | |
| 6,330,608 B1 | 12/2001 | Stiles | |
| 6,418,472 B1 | 7/2002 | Mi et al. | |
| 6,826,690 B1 | 11/2004 | Hind et al. | |
| 7,082,535 B1* | 7/2006 | Norman et al. | 713/163 |
| 7,100,195 B1 | 8/2006 | Underwood | |
| 7,178,025 B2 | 2/2007 | Scheidt et al. | |
| 7,237,264 B1 | 6/2007 | Graham et al. | |
| 7,272,728 B2 | 9/2007 | Pierson et al. | |
| 7,305,562 B1 | 12/2007 | Bianco et al. | |
| 7,310,813 B2 | 12/2007 | Lin et al. | |
| 7,319,987 B1 | 1/2008 | Hoffman et al. | |
| 7,418,665 B2 | 8/2008 | Savage | |
| 7,836,121 B2 | 11/2010 | Elgressy et al. | |
| 8,171,287 B2 | 5/2012 | Villela | |
| 8,327,448 B2 | 12/2012 | Eldar et al. | |
| 8,667,265 B1 | 3/2014 | Hamlet et al. | |
| 2002/0065097 A1 | 5/2002 | Brockenbrough et al. | |
| 2002/0091937 A1 | 7/2002 | Ortiz | |
| 2003/0065918 A1 | 4/2003 | Willey | |
| 2003/0097331 A1 | 5/2003 | Cohen | |
| 2003/0156719 A1 | 8/2003 | Cronce | |
| 2003/0182428 A1 | 9/2003 | Li et al. | |
| 2004/0010685 A1 | 1/2004 | Sakaguchi et al. | |
| 2004/0026496 A1 | 2/2004 | Zuili | |
| 2004/0030912 A1 | 2/2004 | Merkle, Jr. et al. | |
| 2004/0049685 A1* | 3/2004 | Jaloveczki | 713/182 |
| 2004/0107360 A1 | 6/2004 | Herrmann et al. | |
| 2004/0117321 A1 | 6/2004 | Sancho | |
| 2004/0143746 A1 | 7/2004 | Ligeti et al. | |
| 2004/0172531 A1 | 9/2004 | Little et al. | |
| 2004/0172558 A1 | 9/2004 | Callahan et al. | |
| 2004/0177255 A1 | 9/2004 | Hughes | |
| 2004/0187018 A1 | 9/2004 | Owen et al. | |
| 2005/0034115 A1 | 2/2005 | Carter et al. | |
| 2005/0166263 A1 | 7/2005 | Nanopoulos et al. | |
| 2005/0268087 A1 | 12/2005 | Yasuda et al. | |
| 2006/0005237 A1 | 1/2006 | Kobata et al. | |
| 2006/0036766 A1 | 2/2006 | Baupin et al. | |
| 2006/0080534 A1 | 4/2006 | Yeap et al. | |
| 2006/0085310 A1 | 4/2006 | Mylet et al. | |
| 2006/0090070 A1 | 4/2006 | Bade et al. | |
| 2006/0115082 A1 | 6/2006 | Kevenaar et al. | |
| 2006/0161914 A1 | 7/2006 | Morrison et al. | |
| 2006/0168580 A1 | 7/2006 | Harada et al. | |
| 2006/0248600 A1* | 11/2006 | O'Neill | 726/29 |
| 2006/0265446 A1 | 11/2006 | Elgressy et al. | |
| 2007/0050850 A1 | 3/2007 | Katoh et al. | |
| 2007/0061566 A1 | 3/2007 | Bailey et al. | |
| 2007/0078785 A1 | 4/2007 | Bush et al. | |
| 2007/0113090 A1 | 5/2007 | Villela | |
| 2007/0124689 A1 | 5/2007 | Weksel | |
| 2007/0143408 A1 | 6/2007 | Daigle | |
| 2007/0143838 A1 | 6/2007 | Milligan et al. | |
| 2007/0174633 A1 | 7/2007 | Draper et al. | |
| 2007/0207780 A1 | 9/2007 | McLean | |
| 2007/0209064 A1 | 9/2007 | Qin et al. | |
| 2007/0219917 A1 | 9/2007 | Liu et al. | |
| 2007/0234409 A1* | 10/2007 | Eisen | 726/6 |
| 2007/0260883 A1 | 11/2007 | Giobbi et al. | |
| 2008/0052775 A1 | 2/2008 | Sandhu et al. | |
| 2008/0104683 A1* | 5/2008 | Nagami et al. | 726/5 |
| 2008/0120195 A1 | 5/2008 | Shakkarwar | |
| 2008/0120707 A1 | 5/2008 | Ramia | |
| 2008/0152140 A1 | 6/2008 | Fascenda | |
| 2008/0177997 A1 | 7/2008 | Morais et al. | |
| 2008/0242405 A1 | 10/2008 | Chen et al. | |
| 2008/0261562 A1 | 10/2008 | Jwa et al. | |
| 2008/0268815 A1 | 10/2008 | Jazra et al. | |
| 2008/0289025 A1* | 11/2008 | Schneider | 726/10 |
| 2008/0301435 A1* | 12/2008 | Simon | 713/155 |
| 2009/0019536 A1 | 1/2009 | Green et al. | |
| 2009/0083833 A1 | 3/2009 | Ziola et al. | |
| 2009/0113088 A1 | 4/2009 | Illowsky et al. | |
| 2009/0132813 A1 | 5/2009 | Schibuk | |
| 2009/0138643 A1 | 5/2009 | Charles et al. | |
| 2009/0198618 A1 | 8/2009 | Chan et al. | |
| 2009/0300744 A1 | 12/2009 | Guo et al. | |
| 2010/0306038 A1 | 12/2010 | Harris | |
| 2010/0306819 A1* | 12/2010 | Nahari et al. | 726/2 |
| 2012/0030771 A1 | 2/2012 | Pierson et al. | |

FOREIGN PATENT DOCUMENTS

| | | |
|---|---|---|
| GB | 2355322 | 4/2001 |
| WO | WO 92/09160 | 5/1992 |
| WO | WO 00/58895 | 10/2000 |
| WO | WO 01/90892 | 11/2001 |
| WO | WO 03/032126 | 4/2003 |
| WO | WO 2004/054196 | 6/2004 |
| WO | WO 2005/104686 | 11/2005 |
| WO | WO 2008/013504 | 1/2008 |
| WO | WO 2008/127431 | 10/2008 |

OTHER PUBLICATIONS

International Search Report and Written Opinion mailed Aug. 13, 2012, for PCT Application No. PCT/US2012/42257 dated.

"Canon User Manual—Nikon Coolpix S52/S52c," Apr. 21, 2008, entire manual.

David J-L, "Cookieless Data Persistence in Possible," Apr. 23, 2003, Internet Article retrieved on Sep. 21, 2010. XP002603490.

Jensen et al., "Assigning and Enforcing Security Policies on Handheld Devices," 2002, 8 pages.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Iovation, "Using Reputation of Devices to Detect and Prevent Online Retail Fraud," *White Paper*, Apr. 2007.

Iovation, "Controlling High Fraud Risk of International Transactions," *Iovation Reputation Services, White Paper*, May 2007.

Posting from Slashdot on the article "Smart Cards for Windows XP Login" Comment "Re: PIN" posted Dec. 3, 2001.http://en.wikipedia.org/w/index.php?title=Two-factor_authentication&ildid=216794321.

\* cited by examiner

HARDWARE IDENTITY IN MULTI-FACTOR AUTHENTICATION AT THE APPLICATION LAYER

This application claims priority pursuant to 35 U.S.C. §119 (e) to U.S. provisional 61/496,508, filed Jun. 13, 2011, which application is specifically incorporated herein, in its entirety, by reference.

BACKGROUND OF THE INVENTION

1. Field of the Invention

The present invention relates generally to computer network security and, more particularly, methods of and systems for using device identity as an authentication factor.

2. Description of the Related Art

The importance of security in computer networking whose presence reaches into nearly every facet of life today cannot be over-stated. There is a generally recognized trade-off between security and user convenience. For example, if a user's password is easy to remember, it's easy to guess. Some systems require that users change passwords from one randomly generated string to another every few weeks, thereby enhancing system security at the expense of user convenience. Other systems allow users to choose extremely simple passwords and keep them forever, enhancing user convenience at the expense of system security.

Security systems are often described in terms of the number of factors used to authenticate a particular user. For example, a typical username and password system is a two-factor authentication system in that each user must provide two pieces of information about themselves for authentication. Generally speaking, authentication systems with more factors are more secure than those with fewer factors. However, each additional factor requires more involvement of the user such that each increment of added security exacts a cost of increment user inconvenience.

What is needed is a way to add a factor for user authentication without increasing user inconvenience.

SUMMARY OF THE INVENTION

In accordance with the present invention, device authentication is implemented at the application layer of a computer communication model to add a factor to user authentication without requiring any action by the user. User space applications, such as web browsers, e-mail readers, and such, can remain completely unaffected. Instead, the additional authentication factor is provided at the application layer, typically in an operating system, where protocols such as HTTP(s), FTP(s), POP, SMTP, SNMP, DNS and many others are implemented.

In a normal URL retrieval request in a web browser, application layer logic in the operating system formulates a series of protocol requests to effect the retrieval. Such retrieval can begin with an HTTP GET message, for example—though other protocols require different request messages.

When received by a server insisting upon client device authentication at the application layer, such a message generates a responsive message that indicates denial of the request due to inadequate authorization.

The client device, at the application layer responds with a message requesting authorization, providing authentication credentials.

To effect client device authentication beyond the authentication credentials, the server sends an authorization challenge message to the client, requesting one or more parts of a digital fingerprint of the client device. The client device responds with a challenge response message providing those parts of its digital fingerprint.

To determine whether the client device is authorized for the initial request, the server compares the parts of the digital fingerprint included in the challenge response message with a number of digital fingerprints stored in a predetermined client device whitelist. If a match is found, the client device is authorized. Otherwise, the client device is refused.

Digital fingerprints are complex and unusually difficult to spoof without direct access to the client device itself, unlike other authentication factors such as MAC addresses. In addition, the device authentication at the application layer does not affect user convenience at all while providing an addition factor for more reliable computer security.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

In accordance with the present invention, an identifier of a client device 102 (FIG. 1) serves as an additional factor for authentication of a user of client device 102 for server 106 at the application layer. The identifier can be a digital fingerprint of client device 102 and can therefore be much more complex than other hardware features that can be easily spoofed, such as a MAC address for example. The challenge and response between server 106 and client device 102 happens at the application layer and therefore requires no interaction of the user at all, avoiding any increase in user inconvenience.

Figure 2:
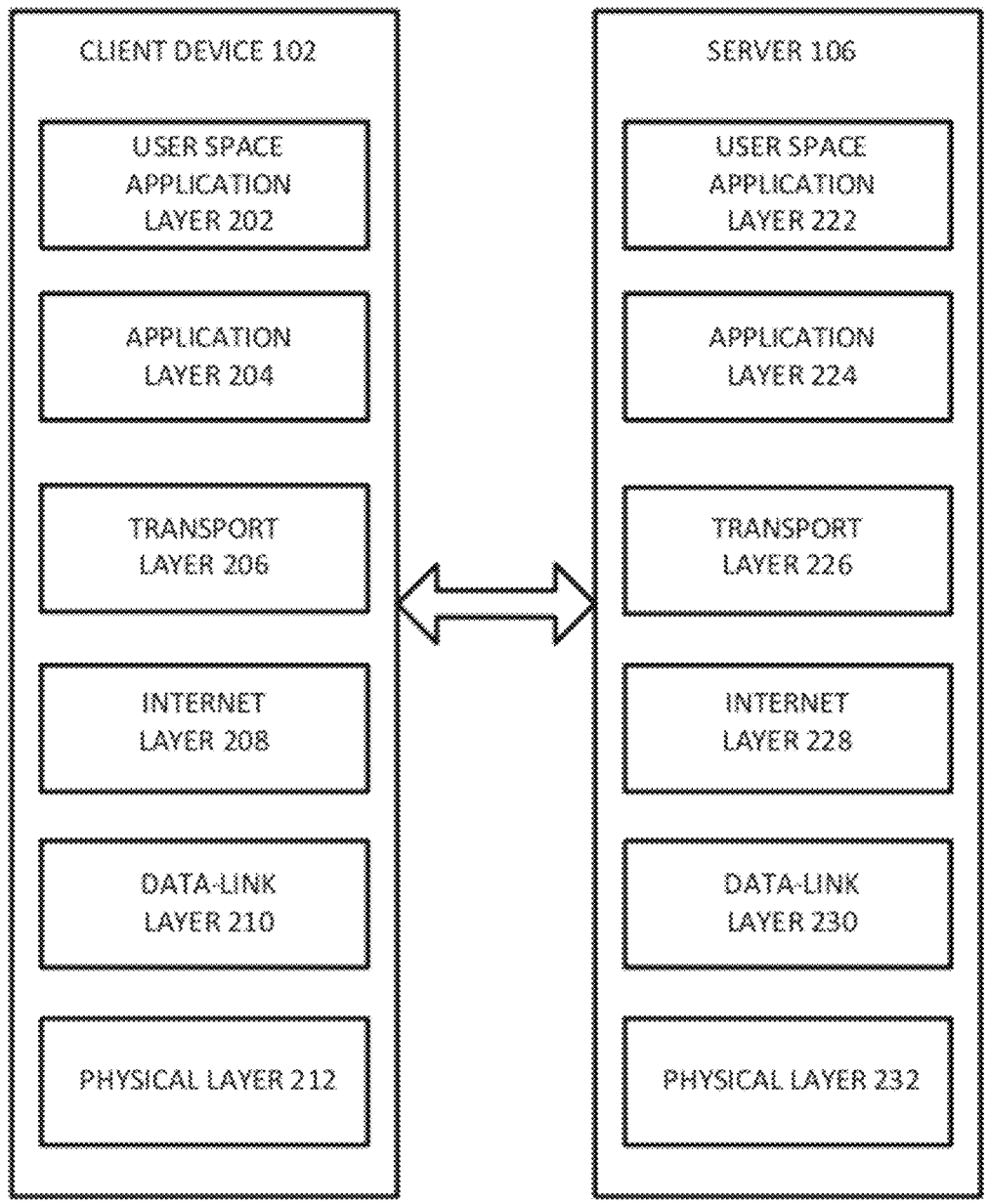
FIG. 2 is a block diagram showing various layers of a computer communication model, including the application layer at which client device authentication is performed in accordance with the present invention.

To facilitate appreciation and understanding of the device-based authentication factor used in accordance with the present invention, abstraction layers of a computer communication model are briefly described. Each of the layers, as shown in FIG. 2, relies on services performed by lower layers. Accordingly, the bottom layers are briefly described first.

Physical layer 212 of client device 102 communicates with physical layer 232 of server 106, perhaps indirectly. At the physical layer, hardware of client device 102 (e.g., network access circuitry 312 described below in conjunction with FIG. 3) physically manipulates and senses voltages, waves, phase, frequencies, and such on one or more conductive wires—by moving or sensing movement of electrons along the wires. In a wireless connection, the conductive wire(s) can be an antenna. Physical layer 232 (FIG. 2) of server 106 similarly manipulates and senses physical movement of electrons along a conductive wire to send and receive signals with physical layer 212 of client device 102 and similar physical layers of any intervening nodes there between.

Physical layers 212 and 232 provide an abstraction of the sent and received signals as bits. For example, physical layer 212 receives bits from data-link layer 210 and sends those bits by physically moving electrons along the conductive wire(s). Similarly, physical layer 212 senses physical movement of electrons along the conductive wire(s) as moved by physical layer 232, or a physical layer of an intervening node, and reports the sensed movements as received bits.

Data-link layer 210 sends and receives data packets, translating into and from bits to send and receive, respectively, through physical layer 212. Data-link 230 is directly analogous to data-link layer 210. The abstraction of bits as data packets allows higher layers to act on individual messages. Data-link layer 210 also detects and processes errors in communication at the physical layer. For example, data-link layer 210 verifies packet checksums to verify that each packet is received accurately and can re-request packets in which checksum verification fails.

Internet layer 208 implements the addressing and routing structure between nodes and hosts attached to wide area network 104, which is the Internet in this illustrative embodiment. When a message from client device 102 is to be sent to server 106, Internet layer 208 creates one or more data packets that embody the message, including addressing that is designed to route the packets to server 106. Internet layer 208 implements the Internet Protocol (IP) portion of TCP/IP and UDP/IP. Internet layer 228 is directly analogous to Internet layer 208.

Transport layer 206 provides transparent transfer of data between client device 102 and other hosts such as server 106. Transport layer 206 processes end-to-end error recovery and flow control and ensures complete data transfer to higher layers. Examples of transport layers include the TCP portion of TCP/IP and the UDP portion of UDP/IP. Transport layer 226 is directly analogous to transport layer 206.

Application layer 204 organizes end-to-end communications links provided by transport layer 206 into a number of communication protocols. Examples include a number of file transport protocols such as HTTP and FTP; messaging protocols such as POP, IMAP, SMTP, and NNTP; and numerous other protocols. Application layer 224 is directly analogous to application layer 204, except that server-side implementations of some network protocols can be omitted from application layer 204 in some client devices.

All of the previously described layers of FIG. 2 are typically included in an operating system of a computing device. An operating system is logic implemented in a computing device that provides services used by other logic implemented in the computing device. The services typically include management of computer resources such as file systems, peripheral device support, networking services, and computer process management. Generally, most users don't directly use an operating system but rather use logic that in turn uses the operating system to perform various tasks. Examples of operating systems in use today include Linux, Unix, MacOS, and various incarnations of the Windows operating system.

User space application layer 202 includes various logic used directly by human users to perform actions as directed by the user. An example of logic implemented at user space application layer 202 is a web browser. As an example, consider that the user has entered a URL in the address field of a web browser and has clicked a GUI button to request that the web page at the URL be displayed in client device 102.

The web browser at user space application layer 202 requests retrieval of the resource identified by the URL (Uniform Resource Location) by application layer 204. The URL identifies the protocol by which the resource should be retrieved. For example, a URL beginning with "http:" indicates the HTTP protocol.

Application layer 204 implements commands such as HTTP GET by opening and managing connections through transport layer 206 (e.g., TCP connections) and Internet layer 208 (e.g., IP connections).

Data-link layer 210 translates the protocols of transport layer 206 and Internet layer 208 into data packets to be sent through physical layer 212.

Physical layer 232 senses physical movement of electrons and interprets the movements into bits and passes them to data-link layer 230. Data-link layer 230 translates the bits into data packets. Transport layer 226 and Internet layer 228 translates the data packets into data flows. Application layer 224 recognizes the data flows as a HTTP GET command including the URL entered by the user.

Application layer 224 forwards the HTTP GET command with the URL to user space application layer 222 that includes a web server. The web server of user space application layer 222 formulates a responsive message, including the resource identified by the URL (e.g., a web page), and the responsive message takes the return trip to user space application layer 202, and the web browser displays the requested web page.

In accordance with the present invention, the device identifier used for authentication is implemented at application layers 204 and 224.

A number of advantages are realized by this. Application layers 204 and 224 are in respective operating systems. Operating systems are exponentially more difficult for most computer users to modify than logic implemented at user space application layers 202 and 222. Accordingly, attempts to crack security measures by modification to an operating system is much more difficult than by modification to user space applications.

In addition, implementation at application layers 204 and 224 adds absolutely no burden on the user regarding authentication. The specific authentication process is described more completely below.

To facilitate appreciation and understanding of the transaction of transaction flow diagram 500 (FIG. 5, described below), the general structure of client device 102 and server 106 are described.

Figure 3:
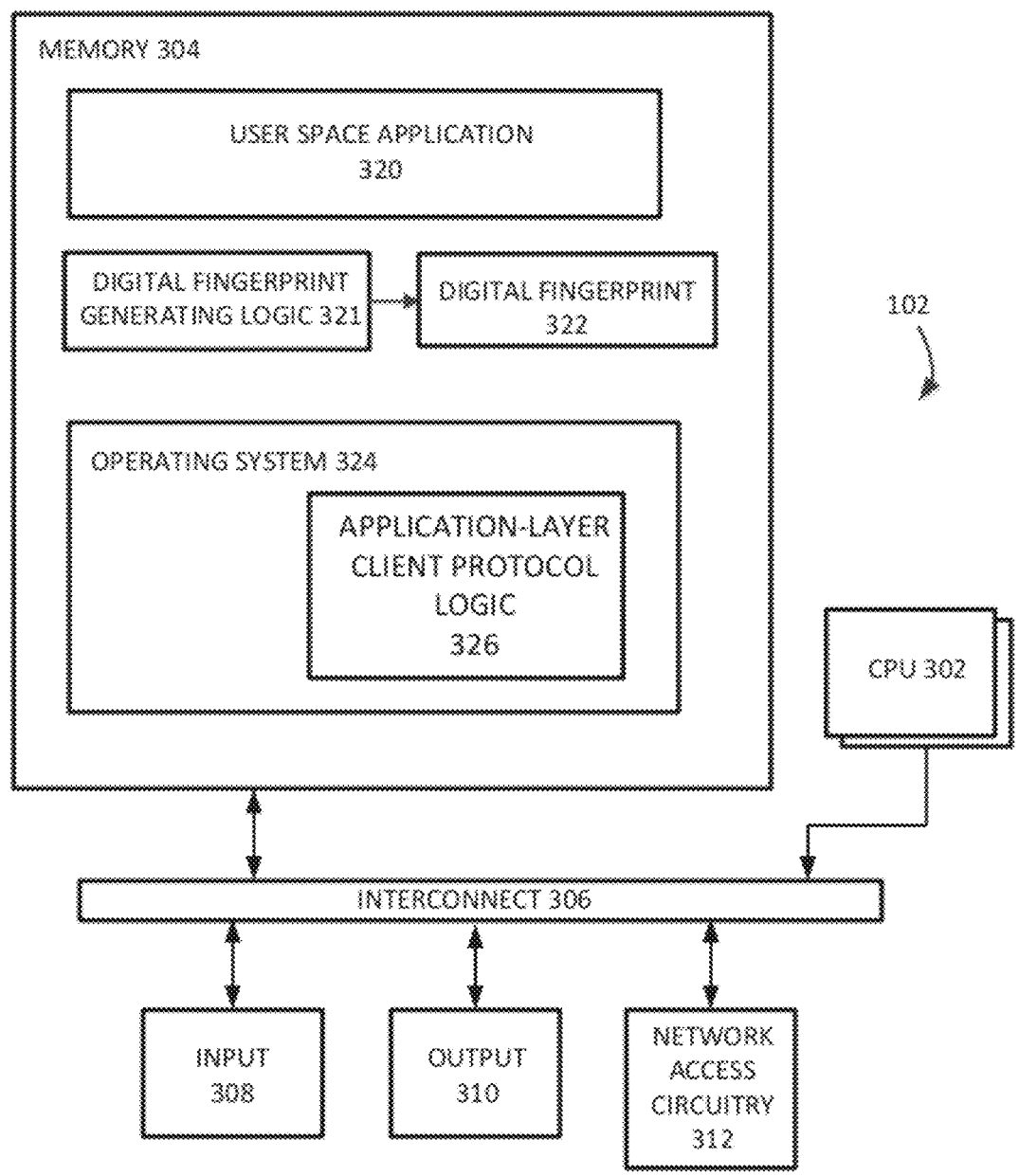
FIG. 3 is a block diagram showing the client device of FIG. 1 in greater detail.

Client device 102 is a personal computing device of the user and is shown in greater detail in FIG. 3. Client device 102 includes one or more microprocessors 302 (collectively referred to as CPU 302) that retrieve data and/or instructions from memory 304 and execute retrieved instructions in a conventional manner. Memory 304 can include generally any computer-readable medium including, for example, persistent memory such as magnetic and/or optical disks, ROM, and PROM and volatile memory such as RAM. Examples of client devices 102 include a desktop computer, a laptop computer, a personal digital assistant, an iPad, a smart phone, a cell phone, and any other stationary or mobile computing device having a processor coupled to memory and to a wired or wireless communications port and being operable directly or indirectly by a human being or by another computing device.

Figure 1:
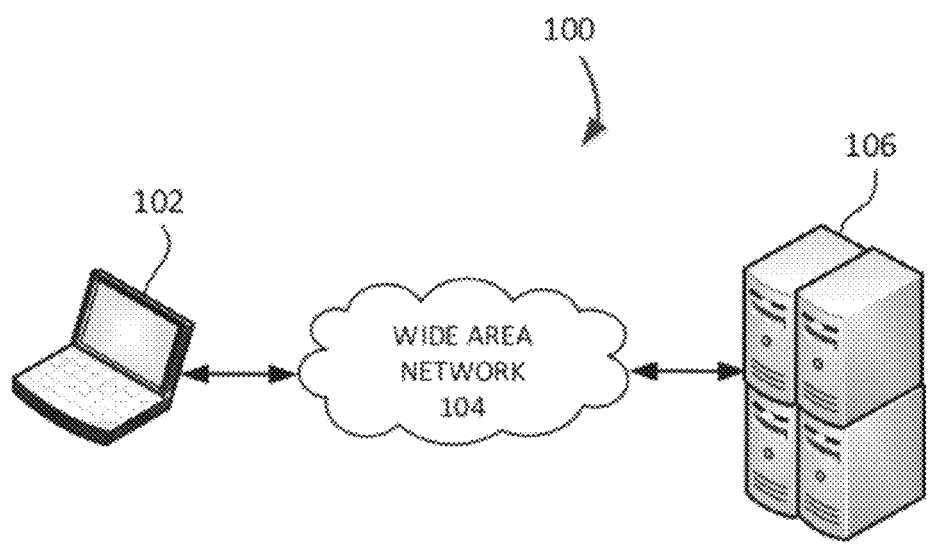
FIG. 1 is a diagram showing a client device and a server computer that cooperate to perform device authentication at the application layer in accordance with one embodiment of the present invention.

CPU 302 and memory 304 are connected to one another through a conventional interconnect 306, which is a bus in this illustrative embodiment and which connects CPU 302 and memory 304 to one or more input devices 308, output devices 310, and network access circuitry 312. Input devices 308 can include, for example, a keyboard, a keypad, a touch-sensitive screen, a mouse, a microphone, and one or more cameras. Output devices 310 can include, for example, a display—such as a liquid crystal display (LCD)—and one or more loudspeakers. Network access circuitry 312 sends and receives data through computer networks such as wide area network 104 (FIG. 1).

A number of components of customer device 102 are stored in memory 304. In particular, user space application 320 and operating system 324, including application-layer client protocol logic 326, are each all or part of one or more computer processes executing within CPU 302 from memory 304 in this illustrative embodiment but can also be implemented using digital logic circuitry. As used herein, "logic" refers to (i) logic implemented as computer instructions and/or data within one or more computer processes and/or (ii) logic implemented in electronic circuitry.

Figure 5:
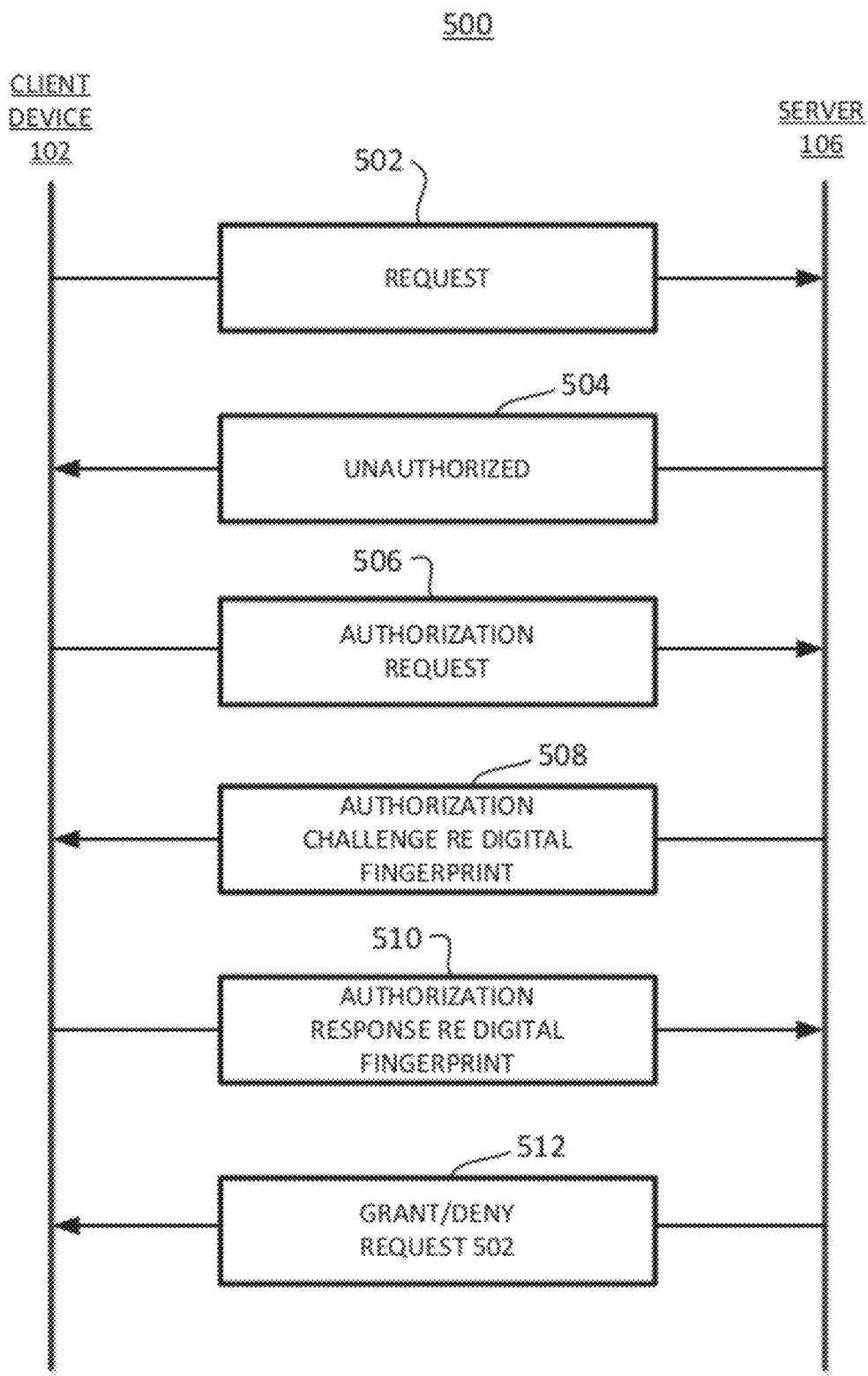
FIG. 5 is a transaction diagram illustrating one embodiment according to the invention of a method by which the client device and server of FIG. 1 cooperate to authenticate the client device.

Digital fingerprint logic 321 is executable software stored in memory 304. When client device 102 is queried for its digital fingerprint, for example, when challenged by server 106 for an authorization 508 (FIG. 5), client device 102 executes digital fingerprint logic 321 to generate a fresh digital fingerprint 322 for use in response to the challenge 510 (FIG. 5). Digital fingerprints and generation thereof are known and are described, e.g., in U.S. Pat. No. 5,490,216 (sometimes referred to herein as the '216 patent), and in U.S. Patent Application Publications 2007/0143073, 2007/0126550, 2011/0093920, and 2011/0093701, the descriptions of which are fully incorporated herein by reference.

In general, digital fingerprint 322 comprises a bit string or bit array that includes or is derived from user-configurable and non-user-configurable data specific to client device 102. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information, and MAC address. Generation of the digital fingerprint 322 includes a combination of operations on the data specific to client device 102, which combination may include sampling, concatenating, appending (for example, with a nonce value or a random number), obfuscating, and hashing, to achieve a desired degree of uniqueness. For example, the desired degree of uniqueness may be set to a practical level such as 99.999999% or higher, to achieve a probability of less than 1 in 100,000,000 that any two client devices will generate identical fingerprints.

In one embodiment, digital fingerprint 322 may be stored in volatile memory and erased after transmission of a challenge response. In another embodiment, digital fingerprint 322 may be stored in persistent memory and written over each time a new fingerprint is generated by fingerprint logic 321. In another embodiment, digital fingerprint logic 321 may be omitted from client device 102 and the digital fingerprint 322 may be stored in persistent memory (e.g. ROM).

Figure 4:
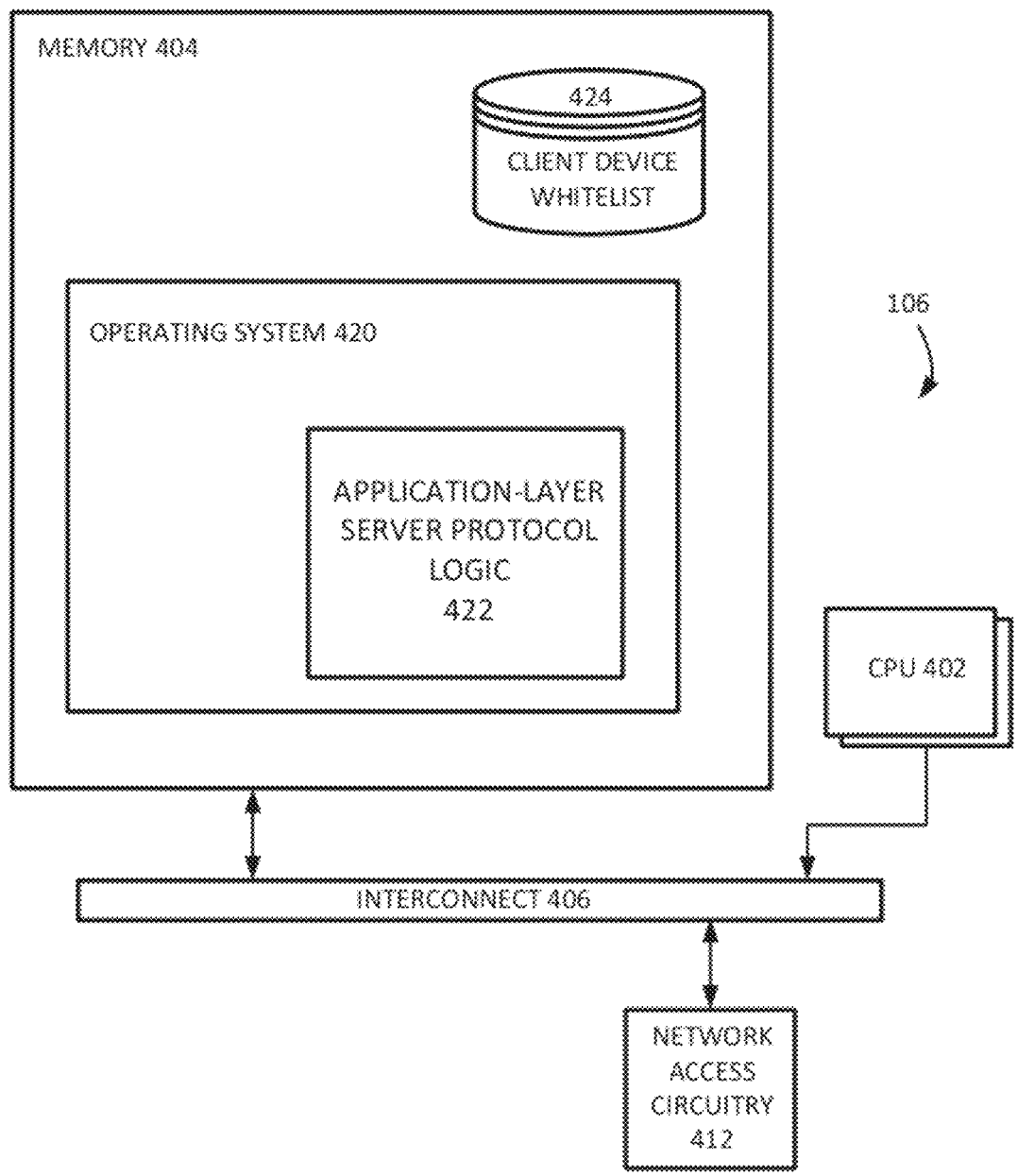
FIG. 4 is a block diagram showing the server of FIG. 1 in greater detail.

Server 106 is shown in greater detail in FIG. 4. Server 106 includes one or more microprocessors 402 (collectively referred to as CPU 402), an interconnect 406, and network access circuitry 412 that are directly analogous to CPU 302 (FIG. 3), an interconnect 306, network access circuitry 312, respectively. As server 106 (FIG. 4) is a server computer, server 106 does not necessarily include input and output devices but can include input devices and output devices that are analogous to input devices 408 and output devices 410, respectively. In addition, while server 106 is shown to be a single computer in this illustrative embodiment, it should be appreciated that the behavior of server 106 described herein can be distributed across multiple, cooperating computer systems using conventional techniques.

A number of components of server 106 are stored in memory 404. In particular, operating system 420, including application-layer server protocol logic 422, is all or part of one or more computer processes executing within CPU 402 from memory 404 in this illustrative embodiment but can also be implemented using digital logic circuitry. Client device whitelist 424 is data stored persistently in memory 404. In this illustrative embodiment, client device 424 are organized as one or more databases but can also be implemented as a simple flat file as part of the configuration of application-layer server protocol logic 422.

In accordance with the present invention, application-layer server protocol logic 422 requires that digital fingerprint 322 (FIG. 3) of client device 102 matches a digital fingerprint stored in client device whitelist 424 (FIG. 4) as a precondition to performing services at the request of client device 102. Other logic in server 106 can require additional authentication, such as conventional two-factor authentication using a username and password combination. However, application-layer server protocol logic 422 adds an additional authentication factor without requiring any intervention by the user of client device 102.

The interaction between application-layer client protocol logic 326 (FIG. 3) and application-layer server protocol logic 422 (FIG. 4) to satisfy the requirement for authentication of client device 102 is illustrated by transaction flow diagram 500 (FIG. 5).

In step 502, application-layer client protocol logic 326 sends a request to application-layer server protocol logic 422. The request can be generally any request according to the protocol implemented by application-layer client protocol logic 326 and application-layer server protocol logic 422. For example, the request can be a HTTP/1.1 GET request by which application-layer client protocol logic 326 hopes to retrieve a web page for user space application 320 (FIG. 3), which could be a web browser in this illustrative example. It should be appreciated that the authentication process between application-layer client protocol logic 326 and application-layer server protocol logic 422 described herein is also applicable to many other protocols.

Examples include a number of file transport protocols such as HTTP(s) and FTP(s); messaging protocols such as POP, IMAP, SMTP, and NNTP(s); authentication protocols such as Kerberos, LDAP, MS-CHAP, MS-CHAPv2, NTLM, PEAP, RADIUS, and SRP, and numerous other protocols such as DNS, EAP, HIP, RPC, SIP, SSH, SNMP(v3), Telnet, TFTP and TLS. For wireless devices, the authentication process of the present invention could be applied to protocols such as Data Synchronization (DS), Device Management (DM), Digital Rights Management (DRM), Multimedia Messaging Service (MMS), Short Message Service (SMS).

Implementing the device-base authentication technique described herein to the DNS protocol could provide security across many protocols. For example, family-oriented and other new top-layer domains for domain names have been proposed. A domain name server can limit access to all domain names in a given branch of the domain name hierarchy, such as a family-friendly top-layer domain, to only client devices that have been reasonably thoroughly authenticated. As a result, people with nefarious intent and who could otherwise spoof authentication credentials would be unable to get IP addresses for any servers of any services in the family-friendly realm unless they could also get physical possession of a client device that is authorized for such DNS access. Such dramatically reduces the likelihood that nefarious actors could access such services. Similarly, access to other sites containing restricted subject matter (such as adult-only material, or material intended only for a special class) could be limited by domain name to client devices that have been pre-authorized using a device fingerprint.

At this point in the transaction of transaction flow diagram 500 (FIG. 5), application-layer server protocol logic 422 does not know whether client device 102 is properly authorized for services provided by application-layer server protocol logic 422. Accordingly, application-layer server protocol logic 422 denies the request of step 502 in step 504, indicating that the request is denied because client device 102 is not authorized to request that service. In this illustrative example, the denial message of step 504 can be an HTTP/1.1 401 Unauthorized message.

In response to the denial of step 504, application-layer client protocol logic 326 sends an authorization request in step 506. The authorization request can include authentication credentials such as a username and associated password provided by the user of user space application 320 (FIG. 3) and client device 102.

Even if the credentials of the authorization request of step 506 are confirmed as legitimate by application-layer server protocol logic 422, application-layer server protocol logic 422 is configured to require additional authentication, namely, that client device 102 is listed among the authorized devices of client device whitelist 424. Accordingly, application-layer server protocol logic 422 sends an authorization challenge message to application-layer client protocol logic 326 in step 506.

In some embodiments, the authorization challenge message of step 506 requests the entirety of digital fingerprint 322 of client device 102. In other embodiments, the size of authorization response messages (such as that returned in step 510 as described below), and therefore the amount of additional message traffic within wide area network 104 (FIG. 1), can be reduced substantially by requesting specific parts of digital fingerprint 322 (FIG. 3). For example, the authorization challenge message of step 506 can request the first three (3) bytes of the first field of digital fingerprint 322, the second and third bytes of the second field, the last four bytes of the third field, and so on. Such a pseudo-random sampling of digital fingerprint 322 provides reliable testing of digital fingerprint 322 while simultaneously and significantly reducing the amount of data required by application-layer server protocol logic 422 and therefore traffic on wide area network 104 (FIG. 1).

The authorization challenge message of step 506 also specifies a manner of representing a response to the challenge, including an encoding method (such as Base64, for example) and a digest format for obscuration of details of digital fingerprint 322. Many digest formats are known, including MD-5, SHA-1, SHA-128, SHA-256, and SHA-1024 for example.

In response to the authorization challenge message of step 506, application-layer client protocol logic 326 sends an authorization response message to application-layer server protocol logic 422 in step 510. Application-layer client protocol logic 326 gathers the portions of digital fingerprint 322 specified in the authorization challenge message of step 506 and packages the portions into a proper response message format, including forming a digest of the proper type and encoding in the specified manner.

In response to the authorization response message of step 510, application-layer server protocol logic 422 compares the encoded digest of the message to encoded digests of corresponding portions of all digital fingerprints represented in client device whitelist 424. Generally, for efficiency reasons, application-layer server protocol logic 422 will have already created and stored encoded digests corresponding to all digital fingerprints represented in client device whitelist 424 such that comparison is a very efficient direct text data comparison.

In some embodiments, full and complete matching of the challenged portions of digital fingerprint 322 with a digital fingerprint stored in client device whitelist 424. In particular, it is plausible that one or more hardware components of client device 102 have been replaced since a former digital fingerprint of client device 102 was added to client device whitelist 424. Application-layer server protocol logic 422 can be configured to consider a digital fingerprint that matches a digital fingerprint represented in client devices whitelist 424 by at least a predetermined threshold to be a matching digital fingerprint Application-layer server protocol logic 422 can consider some elements of a digital fingerprint to be essential. For example, replacement of a processor in a smart phone is so rarely done, if ever, that a different electronic serial number of a smart phone's CPU indicates that it's a completely different smart phone. On the other hand, firmware is frequently upgraded on smart phones such that a different firmware revision number in digital fingerprint 322 does not necessarily indicate a different smart phone. Thus, for a smart phone, application-layer server protocol logic 422 can consider the electronic serial number of a smart phone to be a portion of digital fingerprint 322 that "must match" for a match to be determined and can consider a firmware revision number to be a portion that is an "optional match" portion such that a match can be determined despite a firmware revision mismatch with a digital fingerprint in client device whitelist 424.

In such an embodiment, application-layer server protocol logic 422 can determine that digital fingerprint 322 matches a digital fingerprint in client device whitelist 424 if all "must match" portions match and no more that a predetermined number of "optional match" portions mismatch.

If the encoded digest of the authorization response message of step 510 matches an encoded digest of any of client device whitelist 424, application-layer server protocol logic 422 grants authorization to application-layer client protocol logic 326 and reports the granting in step 512. In this illustrative example, the message of step 512 can be a HTTP 200 OK message. Conversely, if the encoded digest of the authorization response message of step 510 does not match any encoded digest of any of client device whitelist 424, application-layer server protocol logic 422 denies authorization to application-layer client protocol logic 326 and reports the denial in step 512. In this illustrative example, the message of step 512 can be another HTTP 401 Unauthorized message.

It should be appreciated that, while a client device whitelist in which authorized client devices are represented is described, a client device blacklist can also be used in which forbidden client devices are represented.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for authenticating a client device for a data transaction between the client device and a server, the method comprising:
   in the client device, sending a request message to the server in accordance with a protocol at the application layer of a computer communication model;
   in the client device, receiving a response message in accordance with the protocol from the server that is responsive to the request message and that indicates that the request is denied for lack of authorization;
   in the client device, sending an authorization request to the server in accordance with the protocol and in response to the response message;
   in the client device, receiving an authorization challenge message from the server in accordance with the protocol wherein the authorization challenge message requests data representing one or more parts of a digital fingerprint of the client device;
   in the client device, sending a challenge response message to the server in accordance with the protocol wherein the challenge response message includes data representing the one or more parts of a digital fingerprint of the client device; and
   in the client device, receiving a grant message from the server in accordance with the protocol only if the one or more parts of a digital fingerprint of the client device match predetermined data stored within the server representing the one or more parts of a digital fingerprint of an authorized client device;
   wherein the grant message represents a granting of the request of the request message by the server.

2. The method of claim 1 further comprising:
   in the client device, receiving a denial message from the server in accordance with the protocol only if the one or more parts of a digital fingerprint of the client device do not match predetermined data stored within the server representing the one or more parts of a digital fingerprint of an authorized client device;
   wherein the denial message represents a denial of the request of the request message by the server.

3. The method of claim 1 wherein the protocol at the application layer of a computer communication model is selected from a group consisting of DNS, EAP, FTP(s), HIP, HTTP(s), IMAP, Kerberos, LDAP, MS-CHAP, MS-CHAPv2, NNTP, NTLM, PEAP, POP, RADIUS, RPC, SIP, SMTP, SNMP(v3), SRP, SSH, Telnet, TFTP, TLS, DS, DM, DRM, MMS and SMS.

4. A computer system comprising:
   at least one processor;
   a computer readable medium that is operatively coupled to the processor;
   network access circuitry that is operatively coupled to the processor; and
   application layer server protocol logic (i) that executes at least in part in the processor from the computer readable medium and (ii) that, when executed, causes the computer system to authenticate a client device for a data transaction between the client device and the computer system by at least:
   receiving a request message from the client device in accordance with a protocol at the application layer of a computer communication model;
   sending a response message in accordance with the protocol to the client device that is responsive to the request message and that indicates that the request is denied for lack of authorization;
   thereafter, receiving an authorization request from the client device in accordance with the protocol;
   sending an authorization challenge message to the client device in accordance with the protocol wherein the authorization challenge message requests data representing one or more parts of a digital fingerprint of the client device;
   receiving a challenge response message from the client device in accordance with the protocol wherein the challenge response message includes data representing the one or more parts of a digital fingerprint of the client device;
   determining whether the one or more parts of a digital fingerprint of the client device match predetermined data stored within the computer system representing the one or more parts of a digital fingerprint of an authorized client device; and
   sending a grant message to the client device in accordance with the protocol only if the application layer server protocol logic determines that the one or more parts of a digital fingerprint of the client device match the predetermined data stored within the computer system representing the one or more parts of a digital fingerprint of an authorized client device;
   wherein the grant message represents a granting of the request of the request message by the computer system.

5. The computer system of claim 4 wherein the application layer server protocol logic causes the computer system to authenticate the client device for a data transaction between the client device and the computer system by at least also:
   sending a denial message to the client device in accordance with the protocol only if the computer determines that the one or more parts of a digital fingerprint of the client device do not match predetermined data stored within the computer system representing the one or more parts of a digital fingerprint of an authorized client device;
   wherein the denial message represents a denial of the request of the request message by the computer system.

* * * * *